United States Patent [19]

Dulong et al.

[11] Patent Number: 4,985,831
[45] Date of Patent: Jan. 15, 1991

[54] MULTIPROCESSOR TASK SCHEDULING SYSTEM

[75] Inventors: Carole Dulong; Jean-Yves Leclerc, both of Los Altos; Patrick Scaglia, Saratoga, all of Calif.

[73] Assignee: Evans & Sutherland Computer Corp., Salt Lake City, Utah

[21] Appl. No.: 265,372

[22] Filed: Oct. 31, 1988

[51] Int. Cl.$^5$ .............................................. G06F 9/46
[52] U.S. Cl. ................... 364/200; 364/230.3; 364/281.8; 364/281.3
[58] Field of Search ... 364/200 MS File, 900 MS File

[56] References Cited

U.S. PATENT DOCUMENTS

| | | | |
|---|---|---|---|
| 4,318,173 | 3/1982 | Freedman et al. | 364/200 |
| 4,333,144 | 6/1982 | Whiteside et al. | 364/200 |
| 4,342,083 | 7/1982 | Freedman et al. | 364/200 |
| 4,384,324 | 5/1983 | Kim et al. | 364/200 |
| 4,394,727 | 7/1983 | Hoffman et al. | 364/200 |
| 4,445,197 | 4/1984 | Lorie et al. | 364/900 |
| 4,589,093 | 5/1986 | Ippolito et al. | 364/900 |
| 4,590,555 | 5/1986 | Bourrez | 364/200 |
| 4,642,756 | 2/1987 | Sherrod | 364/200 |
| 4,658,351 | 4/1987 | Teng | 364/200 |
| 4,805,107 | 2/1989 | Kieckhafer et al. | 364/200 |

*Primary Examiner*—Michael R. Fleming
*Assistant Examiner*—Debra A. Chun
*Attorney, Agent, or Firm*—Nilsson, Robbins, Dalgarn, Berliner, Carson & Wurst

[57] ABSTRACT

A task status word (TSW) is created for each task indicating, the instant location of the task, its priority and a record of synchronizing signals. Task status words are accessible from an addressable memory section for delivery to a TSW register. From the TSW register, a selected TSW effects control functions to synchronize tasks in different processors or computational units as well as input-output processors. A physical memory manager locates TSWs in response to signals, then checks the location of the task and the nature of the signal to determine signal routing to a processor. If a task is not in a processor, an interrupt manager resolves priority and signal significance indicated by the TSW to determine an interrupt.

14 Claims, 4 Drawing Sheets

MULTIPROCESSOR TASK SCHEDULING SYSTEM

BACKGROUND AND SUMMARY OF THE INVENTION

Recent years have seen a continued pattern of development in the computer field. In that regard, considerable effort has been directed to multiprocessors. Such systems involve a plurality of processors or function units capable of independent operation to process separate tasks in parallel. Usually, the tasks relate to a specified job.

Typically, a multiprocessor includes a plurality of computational units, a memory, a control and at least one input-output processor. Tasks of a job are initiated and processed, sometimes being moved from one computational unit to another. In the course of such operations, tasks must be synchronized and in that regard, a task may need data from another task or from the outside world, supplied through the input-output processor. Under such circumstances, there is a problem in timing and directing signals as well as determining interrupts. The situation is complicated when a task is in need of several signals to proceed with meaningful computation. Accommodating equitable priority among tasks further complicates operations.

Generally in computers, tasks are scheduled and executed in accordance with a scheme of priority. In relating such operations to multiprocessors, problems arise as tasks are shuttled about from processor to processor. To begin with, there is a problem of locating tasks. Accordingly, traditional synchronizing operations, as with respect to individual tasks in a multiprocessor, tend to be complex, time consuming and may be inequitable.

In multiprocessors, it has been previously proposed to provide an interrupt centralizer to maintain a record of the priorities for individual tasks. However, a need exists for a system with improved time economy. Specifically, the present invention recognizes the need for a system that identifies and locates the specific task that should see an interrupt and also determines the timing for interrupts as in relation to tasks awaiting individual signals. Accordingly, effective and time economical task scheduling is accomplished by systems of the present invention.

In general, the system of the present invention is associated in a multiprocessor in which individual tasks are initiated and executed. The system utilizes task status words (TSW) for readily determining the priority of each task, the current location of the task and the status of the task with respect to needed data as indicated by signals. Memory is provided for task status words, addressable on command to function in cooperation with a physical memory manager and an interrupt manager to schedule and synchronize individual tasks.

In an implementation of the system, structure is provided for assigning a task status word to each task when the task is initiated. Addressable memory contains the task status words which are maintained current and are available in relation to task activities. Accordingly, tasks may be effectively synchronized and coordinated on the basis of known task locations, signal significance, priorities and the status of signals relating to interrupts.

BRIEF DESCRIPTION OF THE DRAWINGS

In the drawings, which constitute a part of the specification, exemplary embodiments exhibiting various objectives and features hereof are set forth, specifically.

DESCRIPTION OF THE ILLUSTRATIVE EMBODIMENTS

As indicated above, detailed illustrative embodiments of the present invention are disclosed herein. However, various computation units, operating formats and physical apparatus may be structured in accordance with the present invention and embodied in a wide variety of forms, some of which may be quite different from those of the disclosed embodiments. Consequently, the specific structural and functional details disclosed herein are merely representative; yet in that regard they are deemed to afford the best embodiments for purposes of disclosure and to provide a basis for the claims herein which define the scope of the present invention.

Figure 1:
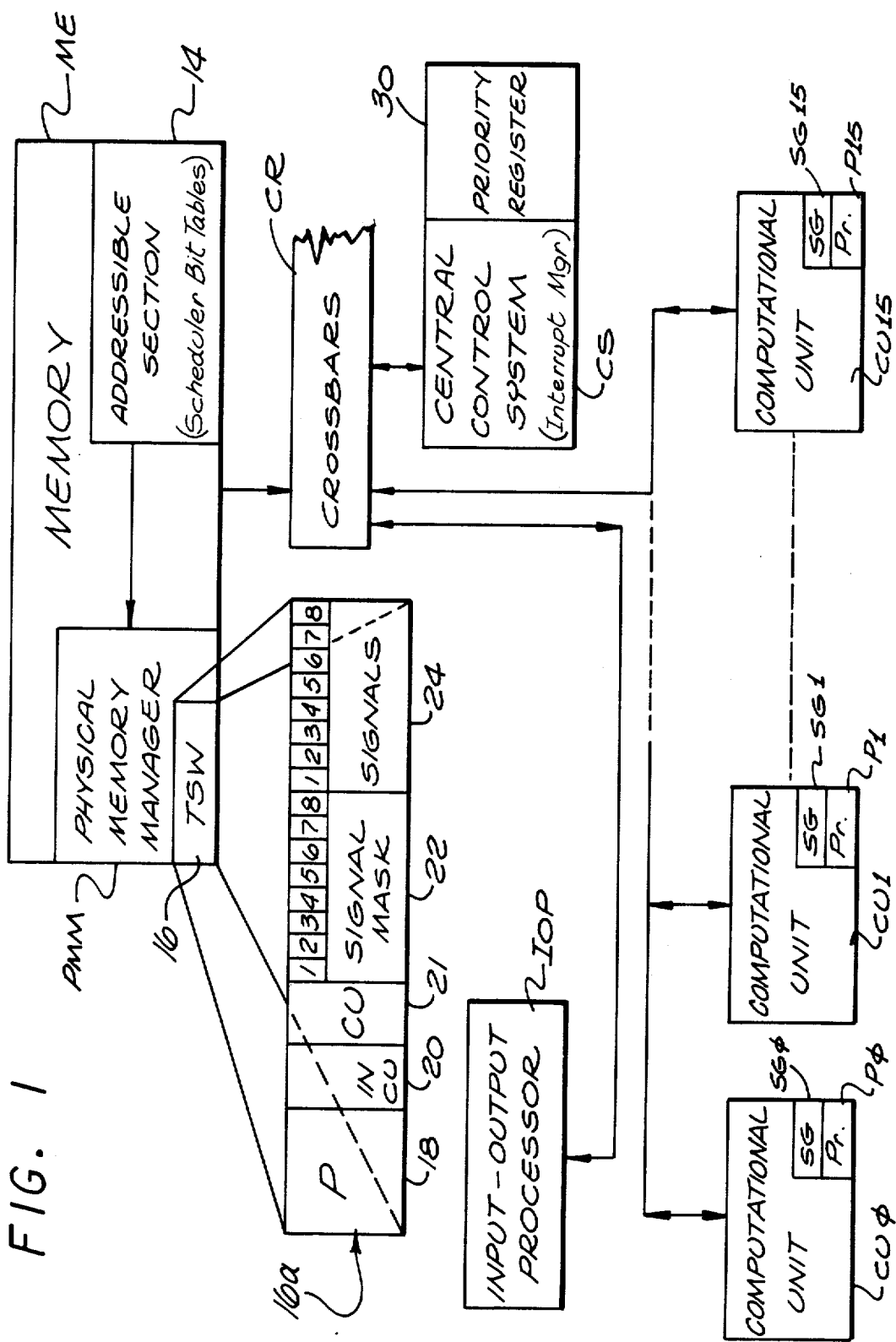
FIG. 1 is a block diagram of a system in accordance with the present invention.

Referring initially to FIG. 1, a multiprocessor is represented generally in the form of certain basic known components. Specifically, the multiprocessor is represented by individual processors or computational units CU0–CU15 (bottom), an input-output processor IOP (center, left), memory ME (top), a central control system CS (right), and interconnecting elements including crossbars CR as represented generally. The system of the present invention is applicable in the framework of the multiprocessor.

Basically, multiprocessors are well known in the prior art as described in a book entitled "High-Performance Computer Architecture" by Harold S. Stone, published 1987 by Addison-Wesley Publishing Company, specifically see a section beginning on page 278. In the operation of such systems, tasks are defined and assigned for parallel processing as to complete a job.

In the system of FIG. 1, a task is defined as a unit of computation that can be executed by a processor, e.g. one of the computational units CU0 through CU15. In execution, each task commands a certain number of general purpose registers, program counters, condition code bits and so on which, as known in the art, are used while the task is physically running in a computational unit. When inactive, all data of a task is copied into the memory ME, to be used when the task is next actuated. Incidentally, if a task is inactive in memory, it is accessible by address, i.e. a virtual address in virtual space. The address of a task is unique in the system and a task can belong to one virtual space only, even though it may be accessible from other virtual spaces through shared memory.

If data for a task becomes available, a signal is provided as from the input-output processor IOP or one of the computational units CU0–CU15. If the task is in one of the computational units CU0 through CU15, the signal may be passed through the crossbar CR directly to the containing computational unit, without software intervention. Alternatively, if the task is inactive in the memory ME, determinations are made with respect to the priority of the task and the extent to which the signal-indicated data fills the needs of the task for proceeding. Under appropriate circumstances, a low priority task in a computational unit may be interrupted and replaced by the task on receiving a signal.

The multiprocessor of the present invention, as represented in FIG. 1, incorporates a physical memory manager PMM in the memory ME for processing task status words (TSW). The memory manager PMM functions with the control system CS utilizing task status words to synchronize tasks as described in detail below. Specifically, details are provided for synchronization both with respect to internal and external events, i.e. between computational units and involving an input-output processor.

Note that the synchronization of tasks is independent of the specific computational units containing the individual tasks. Accordingly, the system is effective to enhance the operation of a multiprocessor by the expedient synchronization of tasks.

Generally with regard to the system of FIG. 1, for the purpose of simplifying the explanation, the memory ME and the central control system CS are illustrated as unitary structures. Alternatively, they may be provided in the form of several distinct units; however, basic forms of both structures are well known in the prior art to function as required in the system of FIG. 1.

In the general operation of the multiprocessor system, tasks are initiated by the central control system CS and scheduled for execution in the computational units CU0 through CU15. Note that tasks are not in fixed relationships with computational units CU, but may be moved from one unit CU to another, or withdrawn to wait in the memory ME. Such operations are described along with related physical structures in the above-referenced book, "High-Performance Computer Architecture". As indicated above, in the course of processing multiple tasks, individual tasks must be scheduled and synchronized, accommodating signal exchanges as between computational units CU0-CU15, along with the input-output processor IOP. In general, the system of the present invention is directed to the economical and effective accomplishment of that function.

Recapitulating, the system is effective to synchronize tasks. That is, as explained above, in a multiprocessor, several computational units may process interrelated tasks which require synchronization. One big job may be split into several tasks, e.g. four individual tasks might be defined. The four tasks might be assigned for independent processing to four computational units operating in parallel. In a specific situation, the computational units might be given individual tasks of a job constituting a large array. As the computation progresses, it is important to synchronize operations.

There may be deviations from the initial assignment of computation units which further complicate the synchronization problem. In accordance herewith, synchronization between individual tasks is performed under control of task status words. Thus, signals are formulated and sent between computational units to accomplish synchronization. In that regard, the task status word assigned to each task is used to control the hardware mechanism as a basis for internal and external task synchronization. All task synchronization is performed by signals as generated by one task and sent to another task or sent by an external input-output processor. Signals might also take the form of clocks as will be apparent to one skilled in the art.

With the initiation of each task by the central control system CS, a task status word is created in the central control system CS and stored in an addressable section 14 of the memory ME available to a control register 16 in the physical memory manager PMM. The task status words are maintained to reflect the current status of each task, e.g. its priority, its location and the situation regarding synchronizing signals.

For example, the input-output processor IOP may have data for a task "25". To indicate the event, the processor IOP provides a signal to the manager PMM with an address for the task status word "25", e.g. TSW25. As a result the manager PMM addresses the memory section 14 with a task status word address, e.g. TSW25, which transfers the task status word "25" to the register 16. From the register 16, the TSW initiates control functions to associate the available data with the task "25". The contents of the register 16 is illustrated by an expanded area 16a to show the individual fields of a registered TSW.

The expanded area 16a illustrates the content and format of task status words. The first field 18 (left) of the expanded area 16a designates the priority of the task. In one operating embodiment of the system, the priority field comprises three bits to represent eight levels of urgency, e.g. priorities "0" through "7", priority "0" being most urgent. Actually, in the referenced embodiment, priority "0" is reserved for special situations. Priority "7" is routine.

The next field 20 of the task status word (expanded area 16a) simply indicates whether or not the task is currently in a computational unit. A single bit is allocated to the binary possibilities, i.e. either the task is in a computational unit CU as indicated by a "1" or it is in the memory ME ("0"). The field 20 is maintained current by the physical memory manager along with the other fields in the task status word.

A field 21 specifies the computational unit CU containing the subject task, if it is in a computational unit. As an example, four bits might accommodate the designation of the sixteen computational units CU0 through CU15. Also, several bits may be used to designate cross processors, that is for example, computational units in cross processors.

A field 22 is designated as a "mask" representing the signal or signals that justify an interrupt. The signal mask field 22 contains eight bits, one for each of eight possible expected signals needed for a task to proceed, i.e. to prompt an interrupt. If any of these signals is received for a task waiting in the memory ME, subject to priority considerations the task performs an interrupt moving the task into a CU.

Finally, a field 24 maintains an account of received signals for an inactive task. Again with regard to one embodiment of the present invention, eight signals are contained in the field as identified. Thus, the field 24 registers an inventory of received signals.

As the field 24 accommodates eight signals (FIG. 1), three or four signals may be designated for input-output operations and three or four other signals may be designated for task synchronization between computational units. Thus, the system accommodates task synchronization involving outside events (through the input-output processor IOP) and internal events (between individual computational units).

As indicated above, the system accommodates signal transfers with and without interrupts. In that regard, while relaying a signal to a TSW in a computational unit is relatively simple, an inactive target task (in memory) involves complications, specifically, the significance of signals received and task priority.

Figure 2:
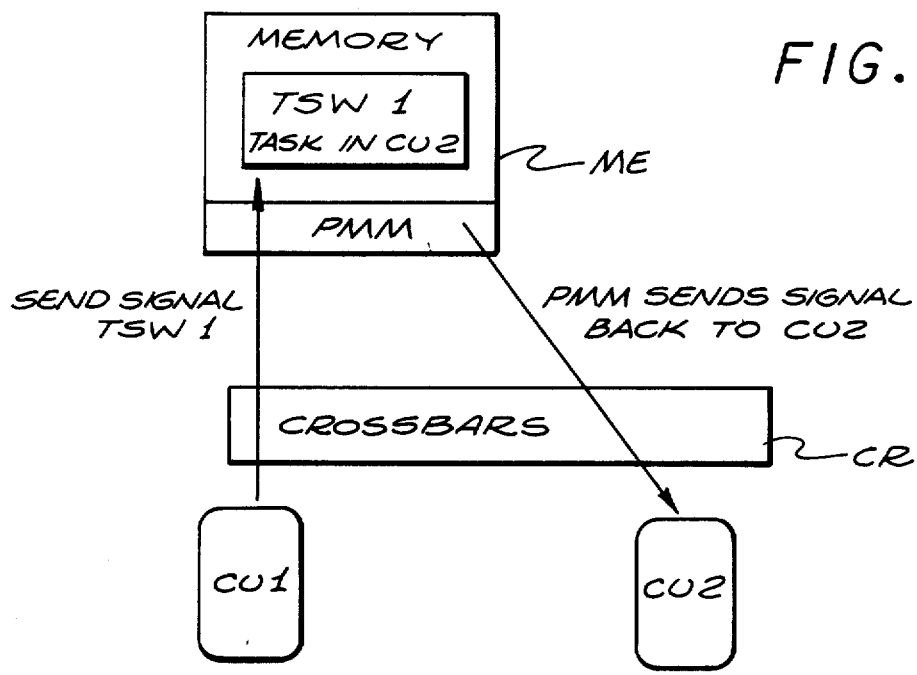
FIG. 2 is a diagrammatic block representation of FIG. 1 illustrating one operation.

FIG. 2 illustrates the transfer of a synchronizing signal from one task in a computational unit to another task in a computational unit. Specifically, a synchronizing signal originated in the computational unit CU1 is passed through crossbars CR to the memory ME. As indicated, the signal addresses the task status word TSW1. The task status word TSW1 indicates that the target task T1 is in the computational unit CU2. Accordingly, the physical memory manager PMM transmits the signal through the crossbars CR to the computational unit CU2. Thus, the computational unit CU2 is informed that the computational unit CU1 has completed its task and accordingly, in twenty or thirty cycles, the two computational units are synchronized on the basis of communication facilitated through the task status words. As indicated above, a similar procedure is involved when the signal originates from an input-output processor as the processor IOP (FIG. 1).

Figure 3:
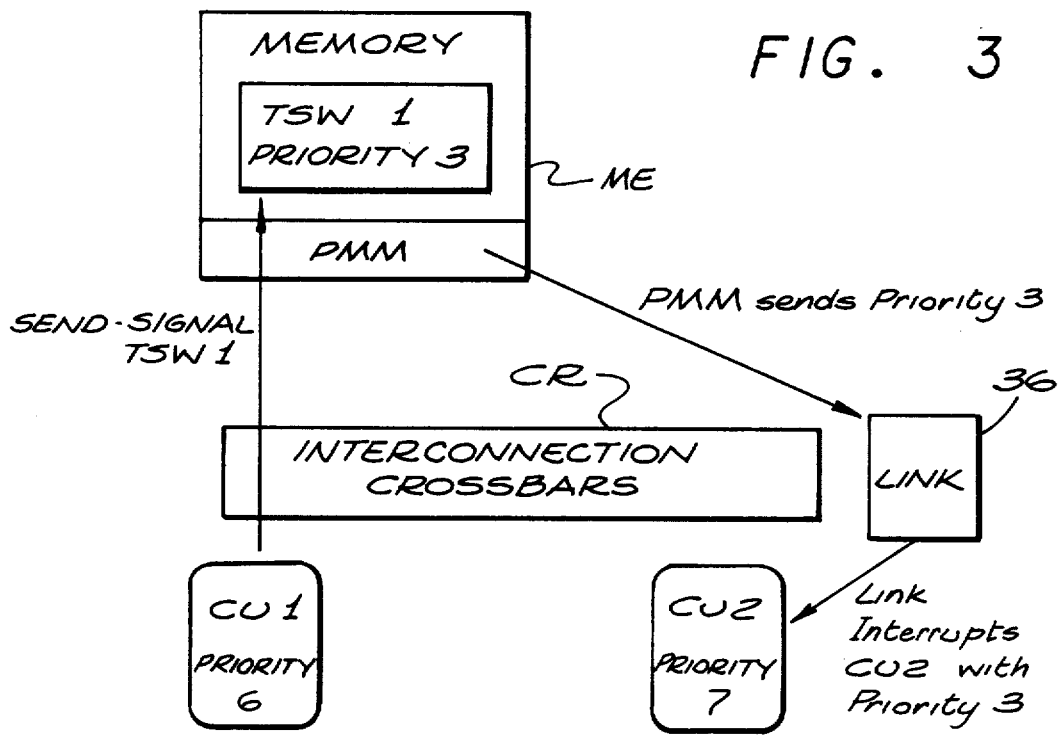
FIG. 3 is a diagrammatic block representation of FIG. 1 illustrating another operation.

FIG. 3 illustrates a different situation, specifically, a situation in which the target task is not in a computational unit when a signal is received. As illustrated, a signal is originated in the computational unit CU1 targeting the task T1. Note that the computational unit CU1 is operating at priority "6", the task T1 has a priority of "3" and the computational unit CU2 is operating at a priority of "7".

The data supplied from the computational unit CU1 to the memory ME includes the signal and the address TSW1 for the task status word of task T1. Accordingly, the task status word TSW1 is fetched indicating a priority of "3". Assuming the signal from the computational unit 1 justifies an interrupt as indicated by the mask 22 (FIG. 1) the physical memory manager PMM sends the high level task T1 of priority "3" to a link 36. As a result, in due course, the link 36 interrupts the lower-priority task in the computational unit CU2 inserting the task T1. Thus, the interrupt sets the high priority task T1 into a processor to proceed on receipt of a critical signal.

Relating these operations to the system of FIG. 1, assume tasks are being processed in the computational units CU0 through CU15. A task status word for each task is stored in the memory section 14. The priority of the task in each computational unit CU is indicated by the content of priority registers P0 through P15, respectively, and in a priority register 30 of the central control system. Signal registers SG0 through SG15 also are indicated in the computational units CU0-CU15, respectively. These registers simply receive signals to interact with tasks as known in the art.

Assume the existence of a task T19 in the computational unit CU1 of relatively high priority and further assume that the task T19 has need of data from the outside world which is to be received through the input-output processor IOP, availability being indicated by a signal "3" in accordance with well known prior techniques. Assume that the input-output processor IOP provides the signal "3" along with the address TSW19. Specifically, the signal and address for word TSW19 are supplied through the crossbar CR to the memory section 14 resulting in the task status word T19 being fetched into the command register 16 of the physical memory manager PMM. The manager PMM then interprets the task status word TSW19 to determine the location of the task T19 and if the task T19 is in memory, whether or not an interrupt should occur.

It was assumed that the exemplary task T19 is in the computational unit CU1. Consequently, the binary bit in field 20 indicates a "1" and the field 21 indicates the containing computational unit CU1. As a result, the physical memory manager PMM commands transfer of the signal from the input-output processor IOP to the computational unit CU1. In that manner, data is effectively and promptly transferred to tasks present in computational units. Note that no software intervention occurs in the dispatch of signals to computational units running identified tasks.

Now, assume that the exemplary task T19 was completed to an extent that it could not proceed without data from the outside world as represented by a signal. Consequently, the task T19 resides in the memory ME awaiting the arrival of a critical signal. Recall, the need for the signal (perhaps with others) is designated in the mask field 22 of the task status word.

Next, assume the arrival of the critical signal from the input-output processor IOP along with the address of the word TSW19. As a result, the task status word for the identified task is supplied to the register 16 in the physical memory manager PMM. In this instance, the field 20 of the task status word indicates that the task is not in a computational unit. Also, the mask field 22 is checked for an indication that the signal merits an interrupt. If so, the priority of the waiting task T19 then is compared with priorities from the register 30 to determine whether or not an interrupt should occur. If the waiting task has greater than routine priority, a computational unit is interrupted and the waiting task is set in such a computational unit for further processing.

If the awaiting task has routine (lowest) priority, it is simply stored in a schedule for priority allocation. Thus, received signals are associated with tasks, then in accordance with mask indications and priority considerations, tasks are either the basis for an interrupt or are set in a schedule for subsequent processing.

Figure 4:
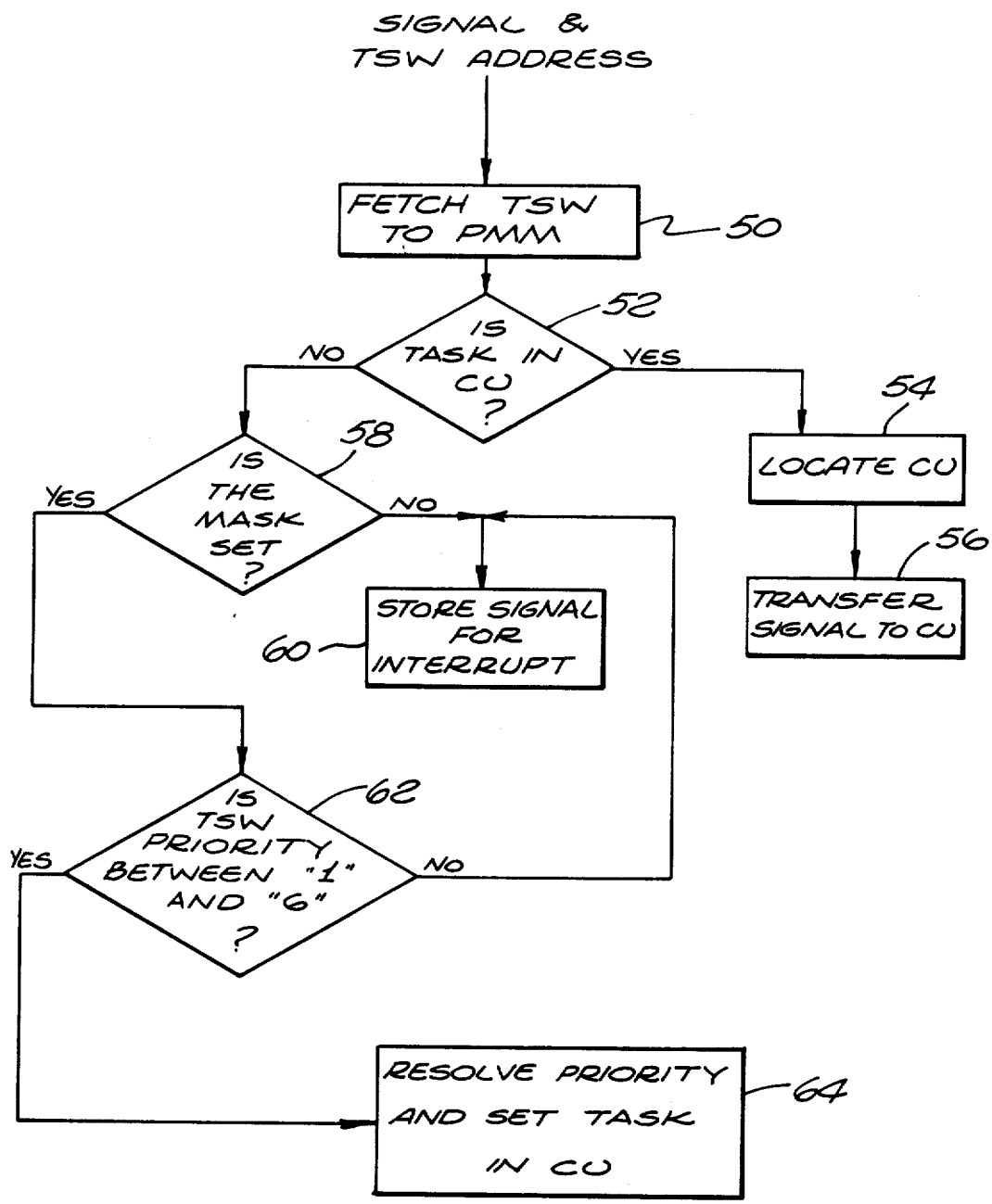
FIG. 4 is a flow diagram of the operating process implemented in the system of FIG. 1.

As explained above, a task can receive eight different signals each of which is represented by a single bit in each of two fields of the task status word, i.e. fields 22 and 24. Signals are always sent to the addressed task status word in memory, thus allowing signals to be sent without knowing the location of the identified task. Upon receiving a signal, the physical memory manager PMM consults the task status word to determine the location of the target task and the process for proceeding in view of the specified conditions. The process initiated by the occurrence of a signal is illustrated in FIG. 4 and will now be considered. In that regard, assume the occurrence of a signal along with the TSW address for the target task. Implementing the address, the task status word is fetched to the physical memory manager (FIG. 1, register 16) in a step represented by a block 50 in FIG. 4.

With access to the TSW, the process poses a query: is the target task in a computational unit? The operation is symbolized by the query block 52 in FIG. 4. If the target is in a computational unit, the identity of the computational unit is provided by the TSW. Accordingly, the task is located (symbolized by the block 54) and transferred to the identified computational unit as indicated by the block 56. Thus, if a target task is in a computational unit, the operation is relatively simple in that the synchronizing signal is simply supplied to the signal register SG of the designated computational unit.

If the addressed task is not in a computational unit, another query is posed as represented by the query block 58 in FIG. 4. Specifically, the operation resolves the query: is the mask set? That is, the query resolves whether or not the indicated signal is present in the signal mask field 22 of the TSW as illustrated in FIG. 1. If the identified signal is present in the mask field 22, the situation may prompt an interrupt. Typically, a signal indicated in the field 22 identifies data, the absence of which has blocked the task.

If the mask is not set (query block 58), the signal is registered in the field 24 and pending a future basis for an interrupt. The operation is illustrated by the block 60 in FIG. 4 and merely involves holding the received signal for a future interrupt. Typically, the situation exists with regard to signals that, while possibly important, do not constitute a key for resuming the task.

Returning to the query of block 58 in FIG. 4, the addition of the received signal to set the mask prompts another query as illustrated by the query block 62. Specifically, the query addresses priority, is the specified TSW priority between "1" and "6"?

As indicated above, the priority "0" is reserved and the priority "7" is routine. Consequently, any priority between "1" and "6" commands attention. Otherwise, the query block 62 involves a step with a negative indication simply returning operation to store the signal as indicated by the block 60.

An affirmative priority test from the step of the block 62 sets the interrupt process into action to establish the target task in a computational unit. If a low priority test is in process, the computational unit processing such a task is interrupted to receive the target task. The operation is represented in FIG. 4 by the block 64.

Recapitulating to some extent, a task status word is assigned to each task and is recognized by the hardware mechanisms as a basis for internal and external task synchronization. All task synchronization is performed by signals as generated by one task and sent to another task or sent by an external input-output processor and might also take the form of clocks.

In accordance with the task status word format of the disclosed embodiment, a task can receive eight different signals. Signals are always sent to the addressed task status word in memory, thus allowing signals to be sent without knowing the location of the identified task. Upon receiving a signal, the physical memory manager PMM consults the task status word to determine the location of the target task, and additionally as described below, determines whether the signal indicates a condition and priority for an interrupt.

Figure 5:
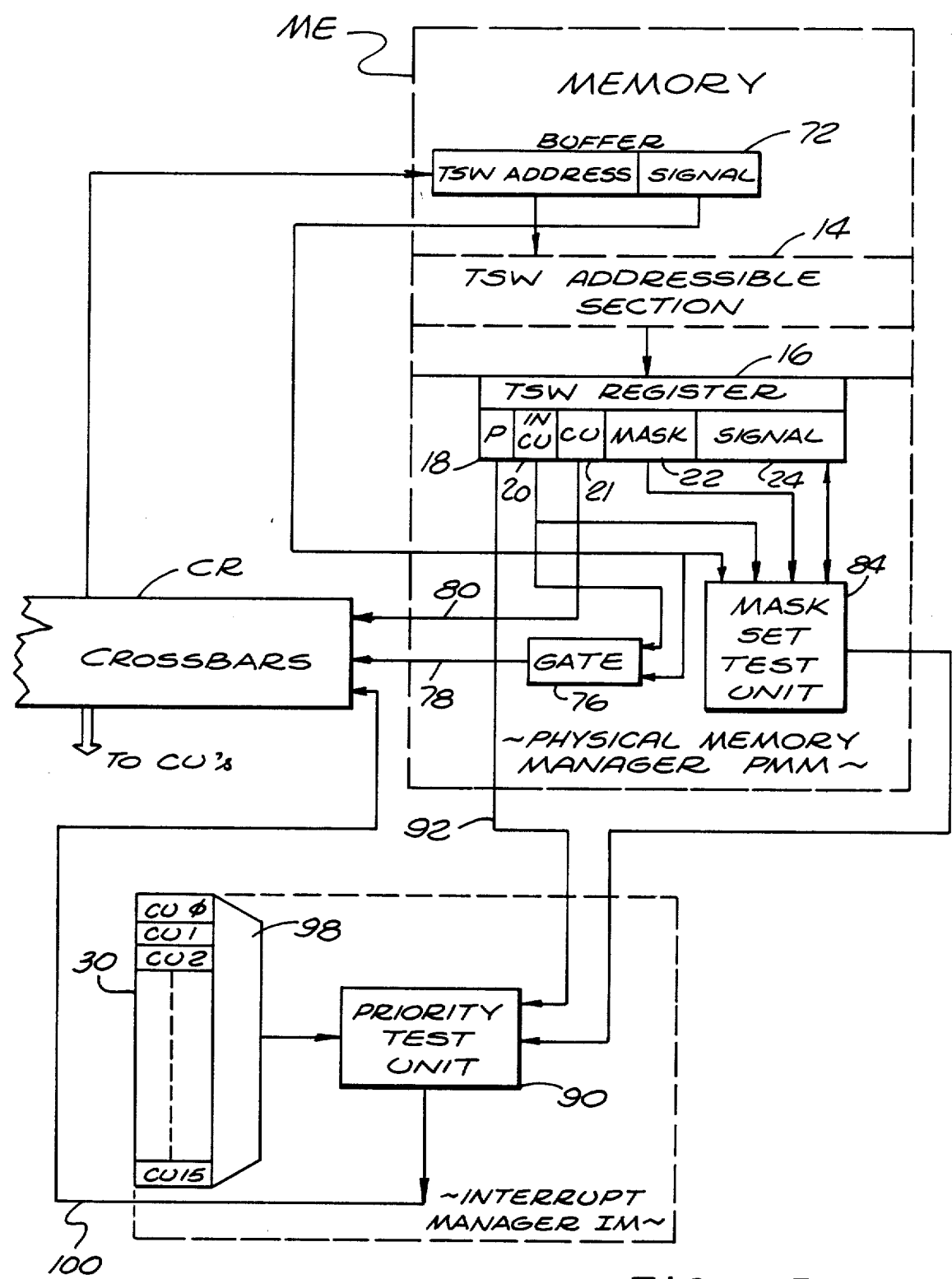
FIG. 5 is a block diagram showing components of the system of FIG. 1 in somewhat greater detail.

To illustrate the system in somewhat greater detail, the structural representation in FIG. 5 shows operating components of the memory ME (FIG. 1) and the interrupt manager IM. Specifically, the memory ME is shown in dashed line configuration including a buffer 72, the addressable section 14 and the physical memory manager PMM including the TSW register 16, a gate 76 and a test unit 84. The interrupt manager IM also is indicated in a dashed line block (lower left) illustrating a component of the central control system CS of FIG. 1. The illustration of FIG. 5 is completed by a representation of the crossbars CR.

In the operation of the system, the priority register 30 (FIG. 5, lower left) is maintained current as the multiprocessor operates. That is, each time there is a change in tasks assigned to computational units, the register 30 is updated to register the priorities of tasks in each of the computational units CU0 through CU15. Similarly, the TSW addressable section 14 (memory ME, upper right) is maintained current in the sense that the task status words consistently indicate the priority, location and signal status with respect to their associated tasks. To draw on a simple analogy, no mail can be received unless a forwarding address is left.

Pursuing the structure of FIG. 5, assume that a signal (and TSW address) arrives from the crossbars CR at the buffer 72. As explained in detail above, the signal and address may be provided from the outside world through an input-output processor or may be provided from one of the computational units CU0–CU15.

From the buffer 72, the TSW address fetches the identified TSW from the section 14 into the TSW register 16. Note that the TSW register 16 is illustrated within the physical memory manager PMM. Also note that the individual fields of the TSW register 16 are indicated, specifically: priority field 18, task-in-CU field 20, CU location field 21, mask field 22 and signal field 24.

If the field 20 holds a "1" bit, then the gate 76 is qualified and passes the signal to the crossbars CR through a signal path 78. Concurrently, a signal is provided through the path 80 to the crossbars CR from the field 21 designating the specific computational unit to receive the signal. Thus, if the target task T is in a computational unit CU, the signal is immediately delivered and set in the register SG of the unit CU in accordance with the process explained above.

To consider the contrary, if the target task is not in a computational unit, a mask set test unit 84 is actuated under control of the field 20 (task not in CU). In that event, the received signal is applied to the test unit 84. For comparison, signals from the mask field 22 are supplied to test for coincidence. If there is not coincidence, i.e. the mask is not set, the received signal is stored in the field 24 pending a future successful test.

If the received signal results in the mask being set, the test unit 84 actuates a priority test unit 90 located in the interrupt manager IM. The priority test unit 90 receives the priority of the target task through a path 92 from the field 18. Essentially, if the target task has priority, the priority of the task is compared with the priorities of currently operating tasks held in the priority register 30 for determination of whether or not an interrupt should occur. Of course, various techniques may be used to correlate or resolve the priorities; however, as indicated above with respect to the disclosed process, the priority test unit 90 simply determines whether or not the priority of the target task is between "1" and "6". In that regard, the priority "0" is reserved and the priority "7" is routine. If the priority of the target task is "7", the test is concluded against an interrupt.

Alternatively, if the target task has a priority between "1" and "6" inclusive, the priority is tested against the content of the priority register 30. Essentially, the least-urgent priority (highest numeral) is supplied from the register 30 through a multiplexor 98 to the priority test unit 90.

If none of the computational units CU0 through CU15 are operating at a priority less urgent than the priority of the target task, there is no interrupt. However, if the target task has greater urgency, an interrupt is issued and the signal is supplied through a path 100 from the unit 90 to the crossbars CR and then to the designated computational unit. In the course of such action, as explained above with reference to FIG. 1, the task in process at the designated computational unit is removed through crossbars CR to storage in the memory ME utilizing structure and techniques as well known in prior systems.

In view of the above descriptions, it will be readily apparent that the system of the present invention affords a very effective technique for synchronizing a multiprocessor, both with respect to individual computational units and input-output processors. The system is capable of considerably improved speed and effectiveness in the communication of synchronizing signals. In that regard, the utilization of hardware elements affords a distinct improvement with substantial advantage in relation to traditional software techniques. Of course, the system of the present invention may be implemented in accordance with a wide variety of techniques and accordingly the scope hereof should be resolved in accordance with the claims as set forth below.

What is claimed is:

1. A task scheduling system for use to synchronize the execution of tasks in a multiprocessor, the multiprocessor cooperatively including a plurality of computational units, a memory, a control means and an input-output processor, and wherein tasks are initiated for execution in said multiprocessor and task signals involved in the execution of tasks are received and specified, said task scheduling system comprising:
   means operating in association with said memory for receiving and storing a plurality of task status words, said task status words identifying the status of certain of said task signals, and a present location of a task with respect to said multiprocessor, wherein said present location may comprise said memory or one of said computational units;
   task status word register means for selectively receiving task status words from said means for storing a plurality of task status words; and
   interpretative control means for supplying said task signals in said multiprocessor to specific locations in said multiprocessor for task synchronization under control of said task status word as stored in said task status word register.

2. A system according to claim 1 wherein said interpretative control means further includes means for supplying a task signal to a specific computational unit under control of said task status word stored in said task status word register.

3. A system according to claim 1 wherein said interpretative control means further includes means for supplying a task signal to a specific location in memory under control of said task status word stored in said task status word register.

4. A system according to claim 1 wherein said task status words further identify a priority for the identified task and said interpretative control means supplies said task signals in accordance with said priority.

5. A system according to claim 4 further including a priority register means for storing the priority of tasks in process at said computational units.

6. A system according to claim 1 wherein said task status words further identify the priority of a task and the task signals pertinent for said task and certain of said task signals specify an interrupt, and wherein said interpretative means further effects interrupts for supplying task signals.

7. A system according to claim 6 wherein said interpretative means further includes a priority register means for storing the priority of tasks in process at said computational units.

8. A task scheduling process for use in a multiprocessor including a plurality of computational units, a memory, a control means and an input-output processor, and wherein tasks are initiated and task signals that are involved in the execution of tasks are specified, said process comprising the steps of:
   forming task status words for said tasks to indicate the status of certain of said task signals and the location of said tasks;
   registering said task status words to be addressable for access;
   receiving task signals, as from said input-output processor, for designated tasks; and
   selectively transferring said task signals to a designated task in accordance with a task status word for said designated task indicating the location of said designated task and the status of task signals for said designated task to thereby synchronize said designated task.

9. A process according to claim 8 wherein the step of forming task status words further includes assigning priorities to said tasks and indicating said priorities in said task status words, and wherein said step of transferring said task signals is in accord with said priorities.

10. A process according to claim 9 further including a step of maintaining a schedule of priorities for said tasks for use in said step of transferring task signals.

11. A process according to claim 8 wherein the step of forming task status words further includes identifying task signals for said tasks and indicating said identified task signals in said task status words, and wherein said step of transferring said task signals is in accord with said task signals.

12. A multiprocessor system, comprising:
   a plurality of computational units;
   a memory, including a memory manager;
   a control system cooperatively coupled with said plurality of computational units and said memory for initiating and processing tasks by the utilization of task control signals;
   means operating in association with said memory for receiving and storing a plurality of task status words, said task status words identifying the status of certain of said task signals, and a present location of a task with respect to said multiprocessor, wherein said present location may comprise said memory or one of said computational units;
   a task status word register means for selectively receiving said task status words from said means for storing a plurality of task status words; and
   interpretive control means for supplying said task status signals in said multiprocessor to specific locations in said multiprocessor for task synchronization under control of said task status word as stored in said task status word register.

13. A multiprocessor system in accordance with claim 12 wherein said interpretive control means supplies said task signals in said multiprocessor to specific locations in accordance with the present location of the task and the status of certain of said task signals.

14. A microprocessor system according to claim 13 wherein said interpretive control means supplies said task signals in the event a task status word indicates a computational unit as the location of the task.

* * * * *